(12) United States Patent
Kusano

(10) Patent No.: US 6,189,642 B1
(45) Date of Patent: Feb. 20, 2001

(54) VEHICLE DRIVE TORQUE DISTRIBUTION CONTROL SYSTEM

(75) Inventor: Masahiro Kusano, Sagamihara (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 08/879,824

(22) Filed: Jun. 20, 1997

(30) Foreign Application Priority Data

Jun. 20, 1996 (JP) .................................................. 8-159797

(51) Int. Cl.⁷ .................................................. B60K 17/354
(52) U.S. Cl. .................................................. 180/247; 180/249
(58) Field of Search .................................................. 180/233, 247, 180/248, 249, 250; 701/69

(56) References Cited

U.S. PATENT DOCUMENTS

| | | | | |
|---|---|---|---|---|
| 4,618,022 | * | 10/1986 | Hayashi | 180/249 |
| 4,700,820 | * | 10/1987 | Hickmann et al. | 192/48.5 |
| 4,771,853 | * | 9/1988 | Nishikawa | 180/247 |
| 4,827,807 | * | 5/1989 | Hayakawa et al. | 74/869 |
| 4,982,809 | * | 1/1991 | Nakamura et al. | 180/248 |
| 4,986,388 | * | 1/1991 | Matsuda | 180/248 |
| 5,010,975 | * | 4/1991 | Sommer | 180/248 |
| 5,195,037 | * | 3/1993 | Tezuka | 180/248 |
| 5,219,038 | * | 6/1993 | Hanada et al. | 180/248 |
| 5,275,252 | * | 1/1994 | Sperduti et al. | 180/248 |
| 5,408,411 | * | 4/1995 | Nakamura et al. | 364/424.01 |
| 5,418,725 | * | 5/1995 | Eto | 180/233 |
| 5,448,478 | * | 9/1995 | Eto | 180/248 |
| 5,450,919 | * | 9/1995 | Shitani | 180/233 |
| 5,461,568 | * | 10/1995 | Morita | 180/233 |
| 5,492,194 | * | 2/1996 | Mc Ginn et al. | 180/233 |
| 5,699,871 | * | 12/1997 | Hara et al. | 180/247 |
| 5,704,863 | * | 1/1998 | Zalewski et al. | 475/88 |
| 5,839,084 | * | 11/1998 | Takasaki et al. | 701/67 |

FOREIGN PATENT DOCUMENTS 2-270641   11/1990   (JP) .

* cited by examiner

*Primary Examiner*—Lanna Mai
*Assistant Examiner*—Andrew J. Fischer
(74) *Attorney, Agent, or Firm*—Foley & Lardner

(57) ABSTRACT

An engine drive torque is distributed to an extra wheel at a predetermined distribution ratio. When the vehicle makes a turn at low speed and when the torque distribution ratio to the extra drive wheel is high, a torsion is produced in the vehicle body, suspension and tires, etc., due to a rotation radius difference between the main and extra drive wheels. After the vehicle has stopped, and the engine is stopped, torque is no longer distributed to the extra drive wheel, the torsion is suddenly released and the vehicle vibrates. According to this invention, the release of torsion is performed gradually by decreasing the torque distribution ratio when the vehicle has stopped, with the engine still running in order to prevent this vibration.

10 Claims, 4 Drawing Sheets

VEHICLE DRIVE TORQUE DISTRIBUTION CONTROL SYSTEM

FIELD OF THE INVENTION

This invention relates to distribution control in a torque distributor mechanism which distributes an engine drive torque between main drive wheels and extra drive wheels according to driving conditions.

BACKGROUND OF THE INVENTION

A device which varies the distribution ratio of a drive torque between the main drive wheels and extra drive wheels of a four-wheel drive vehicle is disclosed for example in Tokkai Hei 2-270641 published in 1990 by Japanese Patent Office.

In this device, the main drive wheels are directly driven, while the extra drive wheels and engine drive shaft are connected via a wet type multi-plate friction clutch.

The torque distribution ratio to the extra drive wheels is varied by varying the grip force of the clutch according to a control signal. The grip force of the clutch is increased the larger the difference between the rotation speeds of the front and rear wheels, i.e. the larger the slip of the rear wheels which are the main drive wheels. As a result, the distribution ratio of the drive force to the front wheels, which are the extra drive wheels, is increased, and the slip of the rear wheels is promptly terminated.

In such a four-wheel drive vehicle, when the vehicle makes a turn during four-wheel drive, the difference in the rotation radius of the front and rear wheels causes a torsion in the suspension, tires and vehicle body.

If the driver stops the vehicle in the turn and turns off the engine, the grip force of the clutch falls to zero because the clutch grip force comes from an oil pump driven by the engine, and as the front wheels suddenly become free, the torsion in the suspension, tyres and vehicle body is immediately released. The release of this torsion causes the vehicle body to vibrate and oscillate in a top/bottom and front/back direction, and this gives an uncomfortable feeling to the driver and passengers of the vehicle.

SUMMARY OF THE INVENTION

It is therefore an object of this invention to prevent a vehicle body from vibrating and oscillating when an engine stopped while the vehicle is making a turn.

In order to achieve the above object, this invention provides a drive torque distribution control system for distributing engine power between a main drive wheel and an extra drive wheel of a vehicle. The system comprises a torque distribution mechanism for transmitting an engine torque to the extra drive wheel at a predetermined distribution ratio, a mechanism for detecting a vehicle speed, a mechanism for setting a first value to the predetermined ratio at a high vehicle speed, and setting a second value higher than the first value to the predetermined ratio at a low vehicle speed, a mechanism for detecting a specific operation by a driver that is performed preceding to turn off the engine, and a mechanism for setting a third value less than the second value to the predetermined ratio when the operation is detected.

It is preferable that the third value is set larger than the first value.

It is also preferable that the vehicle speed detecting mechanism comprises a mechanism for detecting a rotation speed of the extra drive wheel.

It is also preferable that the specific operation detecting mechanism comprises a mechanism for detecting an operation of a parking brake with which the vehicle is provided.

This invention also provides a drive torque distribution control system for a vehicle which is provided with an automatic transmission. This system comprises a torque distribution mechanism for transmitting an output torque of the transmission to the extra drive wheel at a predetermined distribution ratio, a mechanism for detecting a vehicle speed, a mechanism for setting a first value to the predetermined ratio at a high vehicle speed, and setting a second value higher than the first value to the predetermined ratio at a low vehicle speed, a mechanism for detecting that the automatic transmission is in a speed change position corresponding to the stopping of the vehicle, and a mechanism for setting a third value less than the second value to the predetermined ratio when the automatic transmission is changed over to a speed change position corresponding to the stopping of the vehicle.

In this system it is preferable that the mechanism for detecting that the automatic transmission is in a speed change position corresponding to the stopping of the vehicle comprises an inhibitor switch for generating a signal according to a position of a shift lever of the transmission.

It is also preferable that the third value is set larger than the first value.

This invention also provides a vehicle drive torque distribution control system comprising a torque distribution mechanism for transmitting an engine torque to the extra drive wheel at a predetermined distribution ratio, a vehicle speed detector, a detector for detecting that the vehicle has stopped, and a microprocessor programmed to set a first value to the predetermined ratio at a high vehicle speed, set a second value higher than the first value to the predetermined ratio at a low vehicle speed, and set a third value less than the second value to the predetermined ratio when a specific operation is performed by a driver preceding to turn off the engine.

The specific operation may comprises an operation of a parking brake with which the vehicle is provided.

This invention also provides a drive torque distribution control system for a vehicle which is provided with an automatic transmission. The system comprises a torque distribution mechanism for transmitting an engine torque to the extra drive wheel at a predetermined distribution ratio, a vehicle speed detector, a detector for detecting that the vehicle has stopped, and a microprocessor programmed to set a first value to the predetermined ratio at a high vehicle speed, set a second value higher than the first value to the predetermined ratio at a low vehicle speed, and set a third value less than the second value to the predetermined ratio when the automatic transmission is changed over to a speed change position corresponding to the stopping of the vehicle.

The details as well as other features and advantages of this invention are set forth in the remainder of the specification and are shown in the accompanying drawings.

DESCRIPTION OF THE PREFERRED EMBODIMENTS

Figure 1:
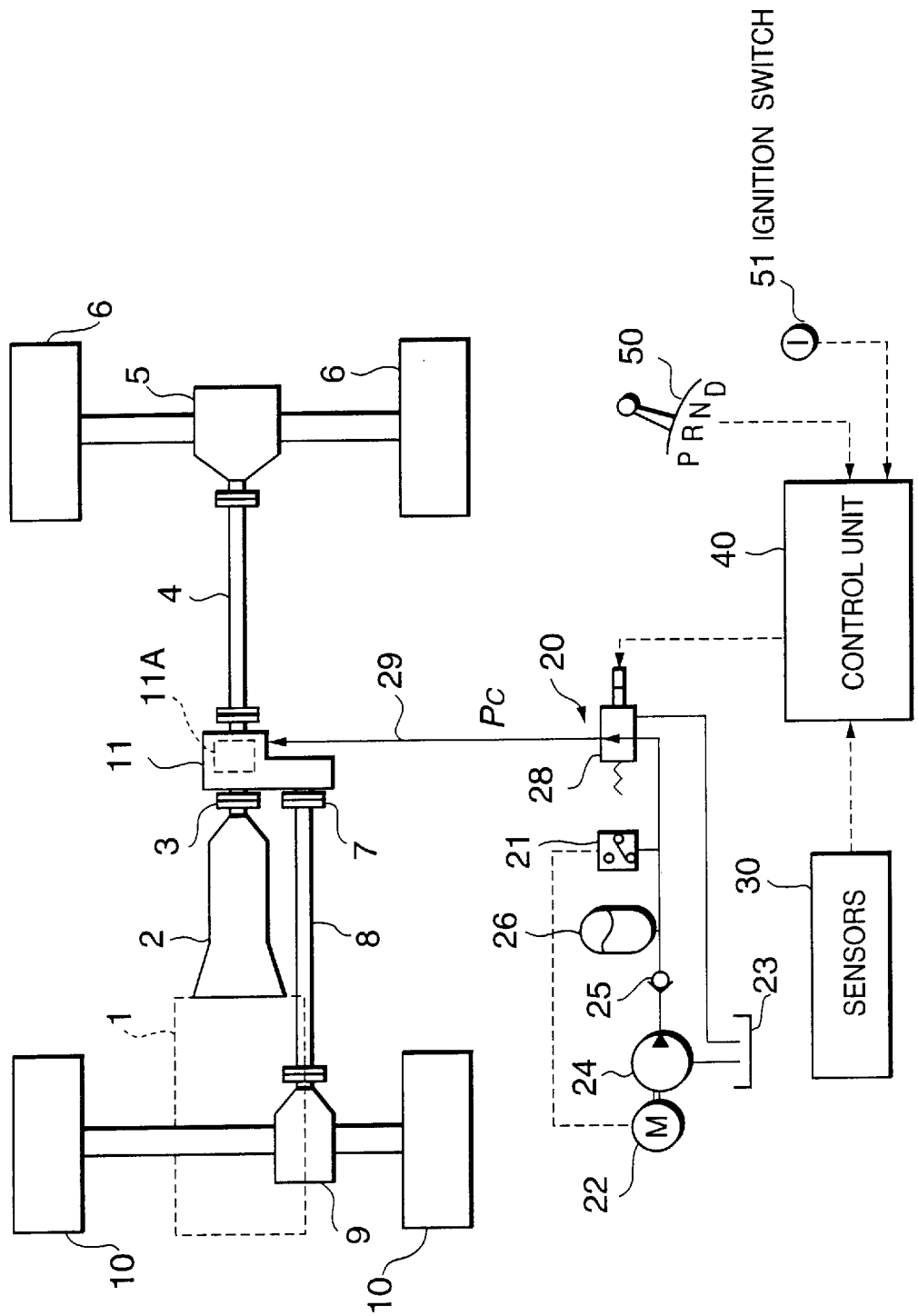
FIG. 1 is a schematic diagram of a drive torque distribution controller according to this invention.

Referring to FIG. 1 of the drawings, a drive torque of an engine 1 of a four-wheel drive vehicle is input to a transfer 11 via an automatic transmission 2. The output torque of the transmission 2 is directly transmitted to rear wheels 6, which are the main drive wheels, via a transfer input shaft 3, the transfer 11, a rear propeller shaft 4 and rear differential 5.

The drive torque distributed to an output shaft 7 of the transfer 11 is transmitted to front wheels 10, which are the extra drive wheels, via a front propeller shaft 8 and front differential 9.

A wet type multi-plate friction clutch 11A, which is a torque distribution mechanism, is housed in the transfer 11 between the transfer input shaft 3 and transfer output shaft 4.

The clutch force of the wet type multi-plate friction clutch 11A is applied by a control hydraulic pressure Pc supplied by a control hydraulic pressure generator 20. The value of the control hydraulic pressure Pc is controlled according to a solenoid drive current i output to a solenoid valve 28 of the control hydraulic pressure generator 20 from a control unit 40.

The control hydraulic pressure generator 20, which is activated when a relief switch 21 is turned on, comprises a stop motor 22 and a hydraulic pump 24 which pressurizes hydraulic fluid in a reservoir tank 23 due to the running of this motor 22.

An accumulator 26 is connected to a discharge port of the hydraulic pump 24 via a check valve 25. The discharge pressure of the hydraulic pump 24 is accumulated as a primary pressure by the accumulator 26, and the cumulative pressure of the accumulator 26 is supplied to the solenoid valve 28 as a secondary pressure or line pressure. The relief switch 21 turns on and off according to this line pressure.

The control hydraulic pressure Pc is supplied to the wet type multi-plate friction clutch 11A of the transfer 11 via a pipe 29. The wet type multi-plate friction clutch 11A updates the grip force of the clutch plates according to the control hydraulic pressure Pc. The distribution ratio of the output torque of the transmission 2 to the transfer output shaft 7 varies according to this grip force.

The control unit 40, which comprises a microcomputer, outputs the solenoid drive current i based on signals input from sensors 30, an inhibitor switch 50 and an ignition switch 51.

Figure 2:
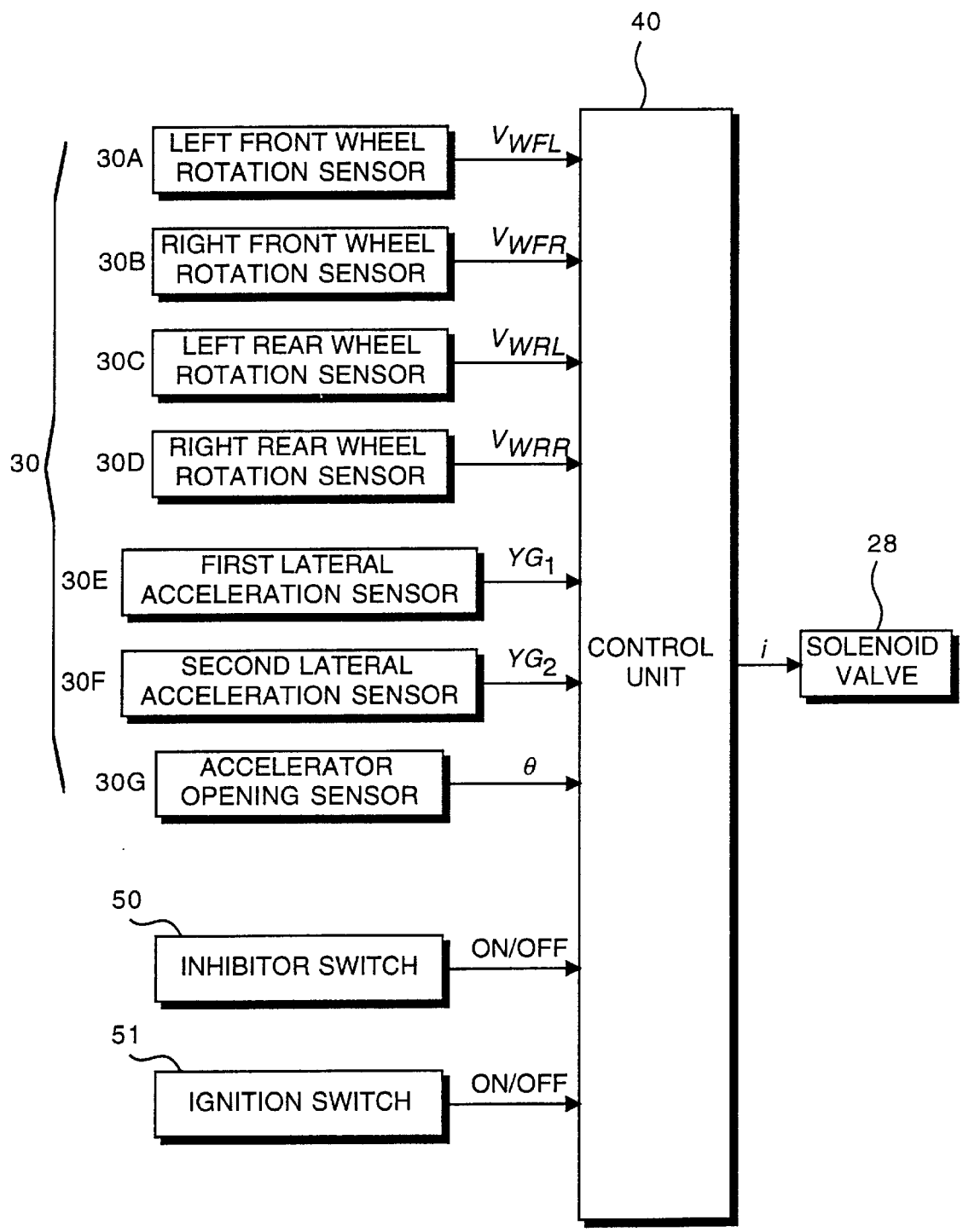
FIG. 2 is a block diagram showing connections between a control unit and sensors according to this invention.

The sensors 30 comprise a left front wheel rotation sensor 30A, right front wheel rotation sensor 30B, left rear wheel rotation sensor 30C, right rear wheel rotation sensor 30D, first lateral acceleration sensor 30E, second lateral acceleration sensor 30F and accelerator opening sensor 30G as shown in FIG. 2, and signals are input to the control unit 40 from these sensors. The first lateral acceleration sensor 30E detects acceleration of a front wheel axis as a first lateral acceleration $Y_{G1}$ and the second lateral acceleration sensor 30F detects acceleration of a rear wheel axis as a second lateral acceleration $Y_{G2}$.

The inhibitor switch 50 outputs a signal according to the position of a shift lever of the automatic transmission 2.

When the shift lever is in a parking position "P" or a neutral position "N", this signal is an ON signal and when the shift lever is in a drive range "D" or reverse position "R", this signal is an OFF signal.

When the engine is running, the ignition switch 51 outputs an ON signal, and when the engine 1 stops, the ignition switch 51 outputs an OFF signal.

Based on these input signals, the control unit 40 outputs the control current i to the solenoid valve 28, and varies the grip force of the wet type multi-plate friction clutch 11A via the control hydraulic pressure Pc supplied thereto.

Figure 3:
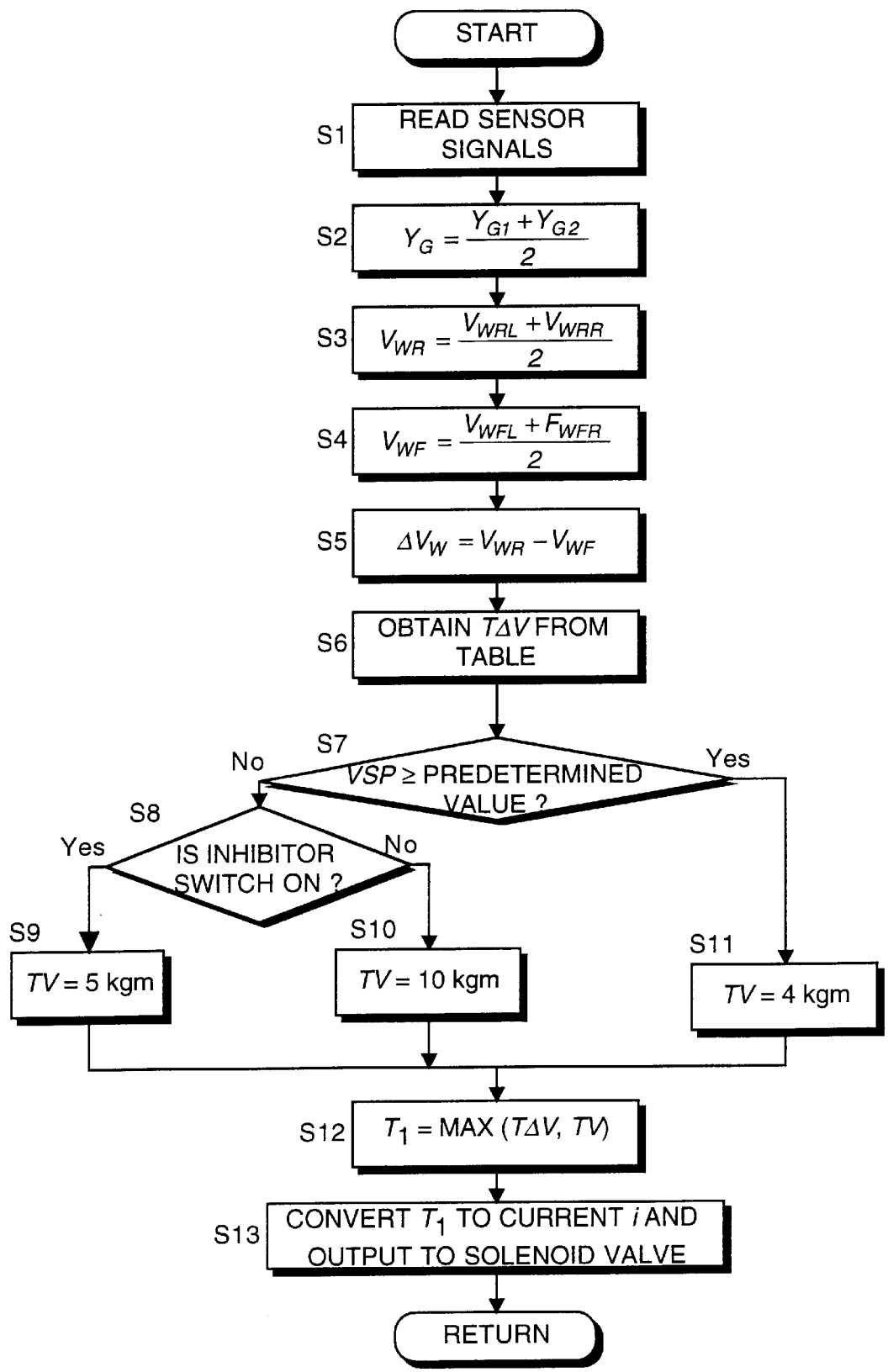
FIG. 3 is a flowchart describing a torque distribution control process performed by the control unit.
Figure 4A:
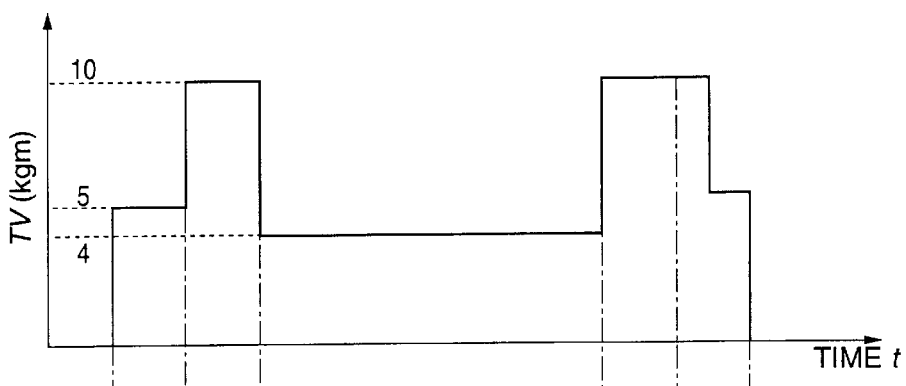
FIGS. 4A–4D are timing charts describing changes of a clutch grip torque and vehicle speed with reference to a state of an ignition switch and inhibitor switch under the torque distribution control by the controller.
Figure 4B:
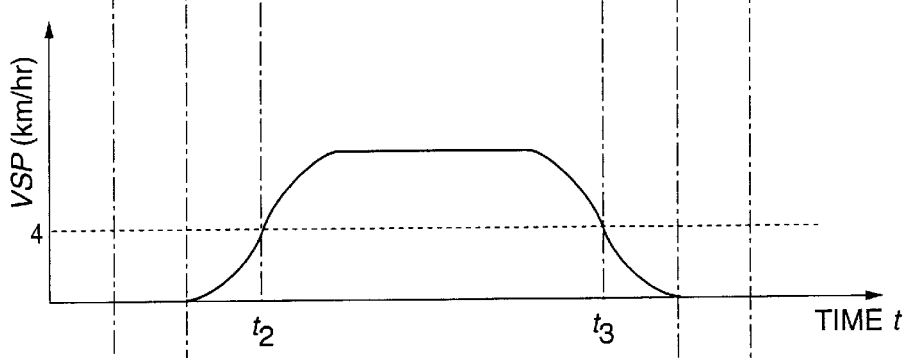
Figure 4C:
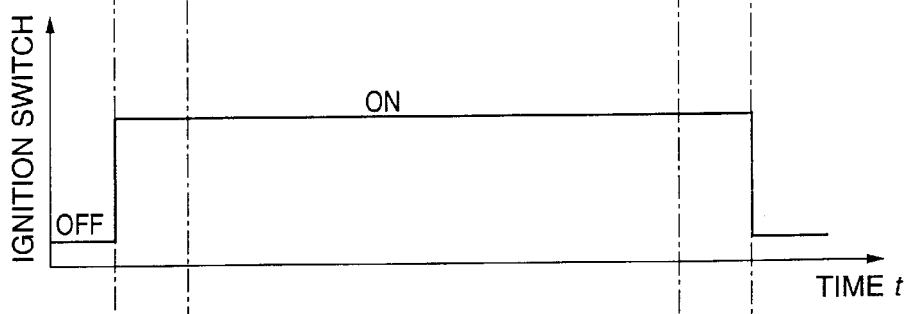
Figure 4D:
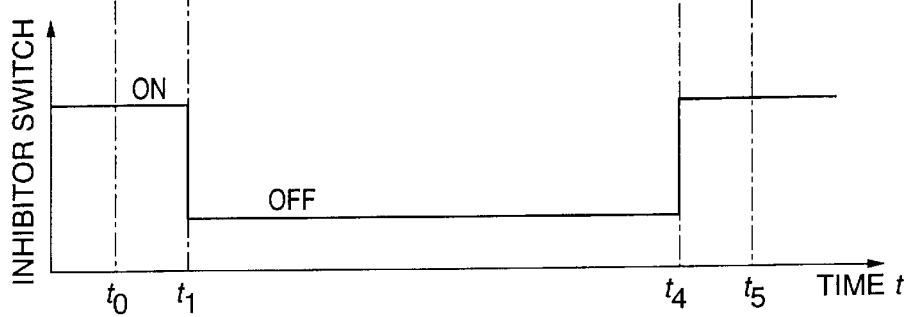

The process of controlling the distributed torque to the extra drive wheels 10 by the control unit 40 will next be explained referring to the flowchart of FIG. 3.

This flowchart is executed at a fixed interval.

In a step S1, a right front wheel speed $V_{WFR}$, left front wheel speed $V_{WFL}$, right rear wheel speed $V_{WRF}$, left rear wheel speed $V_{WRL}$, first lateral acceleration $Y_{G1}$, second lateral acceleration $Y_{G2}$ and accelerator opening q are read from the sensors 30. Signals are read also from the inhibitor switch 50 and ignition switch 51.

In a step S2, the average value $Y_G$ of the first lateral acceleration $Y_{G1}$ and second lateral acceleration $Y_{G2}$ is calculated by the following equation.

$$Y_G = \frac{Y_{G1} + Y_{G2}}{2}$$

In a step S3, a rotation speed $V_{WR}$ of the rear wheels 6 is calculated by averaging the left-hand wheel speed $V_{WRL}$ and right-hand wheel speed $V_{WRR}$.

$$V_{WR} = \frac{V_{WRL} + V_{WRR}}{2}$$

In a step S4, a rotation speed $V_{WF}$ of the front wheels 10 is calculated by averaging the left front wheel speed $V_{WFL}$ and right front wheel speed $V_{WFR}$. Herein, the rotation speed of the front wheels 10 is considered as a value corresponding to the vehicle speed VSP.

$$V_{WF} = \frac{V_{WFL} + F_{WFR}}{2}$$

In a step S5, a rotation speed difference $\Delta V_W$ between the rotation speed $V_{WR}$ of the rear wheels 6 and the rotation speed $V_{WF}$ of the front wheels 10 is computed.

$$\Delta V_W = V_{WR} - V_{WF}$$

In a step S6, a grip force $T\Delta V$ of the wet type multi-plate friction clutch 11A is found for example by looking up a table built into the controller 40, based on the rotation speed difference $\Delta V_W$ and lateral acceleration $Y_G$. According to this table, the grip force $T\Delta V$ increases and the distribution ratio of the drive torque to the front wheels 10 increases the larger the rotation speed difference $\Delta V_W$. Also according to the table, the distribution ratio of drive torque to the front wheels 10 decreases the larger the lateral acceleration $Y_G$.

This is in order to avoid a so-called tight corner braking phenomenon on roads with a high frictional coefficient when $Y_G$ is large. Tight corner braking is a phenomenon which occurs when a large drive torque is supplied to the front wheels when the vehicle is making a turn. In this situation, it is difficult to turn due to the difference of rotation radius of the front and rear wheels, and the driver feels as if braking is applied.

In a step S7, it is determined whether or not the vehicle speed VSP (=$V_{WF}$) is higher than a predetermined speed.

Herein, it is desirable to set this predetermined speed to the minimum detectable speed, e.g. if the minimum speed that can be detected by the front wheel rotation sensors 30A and 30B is 4 Km/hr, the predetermined speed is set to 4 km/hr.

When the vehicle speed VSP is equal to or higher than the predetermined speed, a second minimum value TV of the grip force of the wet type multi-plate friction clutch 11A is for example set to 4 kgm in a step S11.

On the other hand, when the vehicle speed VSP is less than 4 Km/hr, the routine proceeds to a step S8, and a first or third minimum value of the grip force is set according to the state of the inhibitor switch 50.

In the step S8, it is determined whether or not the vehicle is running.

When the inhibitor switch 50 is ON, i.e. when the shift lever is at "P" or "N", it is determined that the vehicle is not running and the routine proceeds to a step S9.

In the step S9, the third value of the grip force of the torque distribution clutch 11A is set to, for example 5 kgm.

When the inhibitor switch 50 is OFF, it is determined that the vehicle is running at low speed, the routine proceeds to a step S10, and the first minimum value of the grip force is set to for example 10 kgm to maintain starting stability on a slippery road surface as in the aforesaid prior art.

As a result, up to a vehicle speed of 4 Km/hr after the vehicle starts, the minimum value TV of grip force is set at a comparatively high value, and when the vehicle speed VSP exceeds the predetermined speed of 4 Km/hr, the minimum value TV falls to a lower value.

Next, in a step S12, the larger of the grip force TΔV found in the step S6 and the minimum value TV set in the steps S9–S11, is set as a target grip force $T_1$.

In a step S13, this target grip force $T_1$ is converted into the solenoid current i, and is output to the solenoid valve 28.

The solenoid valve 28 increases or decreases the control hydraulic pressure Pc according to this solenoid current i so as to obtain a target grip force.

Next, the variation of this grip force under this control process will be described with reference to FIGS. 4A–4D.

The engine 1 is started at a time $t_0$ when the vehicle is not running, the vehicle starts running at a time $t_1$ and stops running at a time $t_4$, and the engine 1 stops at a time $t_5$.

First, as the shift lever is in the parking position "P" or neutral position "N" when the vehicle is not running, the inhibitor switch is ON when the engine 1 starts at the time $t_0$.

The minimum value TV of the grip force of the wet type multi-plate friction clutch 11A is therefore set to 5 kgm in the process of steps S8 and S9. When the main drive wheels 6 do not slip or slip only very little, the wet type multi-plate friction clutch 11A is controlled by this minimum TV.

When the vehicle starts at the time $t_1$, the shift lever is set to the drive position "D" or updating position "R", and the inhibitor switch 50 switches OFF. Consequently, from when the vehicle starts to when the vehicle speed VSP reaches the predetermined value of 4 Km/h, the minimum value TV of the grip force of the wet type multi-plate friction clutch 11 A is set to 10 kgm, which is the first minimum value, by the process of the steps S8 and S10.

As the minimum value TV of the wet type multi-plate friction clutch 11A is set to the first minimum value, which is the largest among the minimum values, a sufficiently large drive torque is distributed to the front wheels 10, which are the extra drive wheels, when the vehicle starts. Therefore, racing of the rear wheels 6 which are the main drive wheels can be prevented even if the road surface is slippery.

At a time $t_2$, the vehicle speed VSP reaches the predetermined value of 4 Km/h. Subsequently, the minimum value TV of the grip force decreases to 4 kgm, which is the second minimum value, in the process of steps S7 and S11.

As the minimum value of the grip force is suppressed, excessive drive torque is not distributed to the front wheels 10 in this running state as far as the drive wheels do not suffer from slipping.

When a large drive torque is supplied to the front wheels 10 when the vehicle is making a turn, the aforesaid tight corner braking occurs, but, according to this drive torque distribution controller, as the minimum value TV of the grip force when the vehicle is traveling at a speed of 4 km/hr or more is set as low as 4 kgm, tight corner braking is not likely to occur.

When the vehicle is stopped, firstly at a time $t_3$ when the vehicle speed VSP is less than 4 Km/h, the minimum value TV of grip force is updated to the first minimum value of 10 kgm in the steps S7, S8 and S10. As a result, the distribution ratio of drive torque to the front wheels 10 increases.

At the time $t_4$, the vehicle speed VSP=0 again, the shift lever changes to the parking position "P" or the neutral position "N", and the signal from the inhibitor switch 50 is ON. Therefore the minimum value TV of grip force decreases to 5 kgm, which is the third minimum value, in the process of steps S7–S9.

At the time $t_5$, the ignition switch is OFF, and the engine 1 stops. As the hydraulic pressure supplied by the control hydraulic pressure generator 20 also stops, the grip force is 0, and the grip of the wet type multi-plate friction clutch 11A is released. Due to this operation, the drive mode changes from a four-wheel drive to a two-wheel drive by the rear wheels 6 alone.

When the vehicle is stopped during a turn and the engine is stopped, a torsion is produced in the suspension, tires or vehicle body due to a difference of rotation radius of the inner and outer wheels or of the front and rear wheels in the turn. When, due to the engine stopping, the pressure generated by the control hydraulic pressure generator 20 becomes zero, this torsion is released. However according to this drive torque distribution controller, the minimum value of the grip force of the wet type multi-plate friction clutch 11A first decreases to 5 kgm which is the third minimum value, due to the shift of the shift lever to the stop position, and it then decreases to zero when the engine stops. The release of torsion in the vehicle body is therefore gradual, compared to the case where the minimum value of the grip force suddenly falls to zero from the first minimum value of 10 kgm.

As a result, even when the vehicle stops during a turn, vibration or oscillation of the vehicle body due to sudden release of this torsion is suppressed, and the pleasant feeling of traveling in the vehicle is not impaired.

According to this embodiment, the third minimum value was set at 5 kgm, but if this value is set even lower, the torsion in the vehicle body may be released more rapidly after the vehicle turns and stops. If however this third minimum value is set lower than 4 kgm which is the second minimum value required to prevent tight corner braking, the distribution ratio of drive torque to the front wheels 10 decreases when the vehicle restarts after stopping. As a result, the starting stability of the vehicle on a slippery road surface may be adversely affected.

In order to ensure starting stability when the vehicle restarts after stopping, and to prevent vibration of the vehicle body after a turn and a stop, it is therefore desirable to set the third minimum value less than the first minimum value of 10 kgm and equal to or greater than the second minimum value of 4 kgm.

According to the above embodiment, the stopping of the vehicle was detected from the ON state of the inhibitor switch 50, however it may also be detected from the state of the side brake, etc.

The embodiments of this invention in which an exclusive property or privilege is claimed are defined as follows:

What is claimed is:

1. A drive torque distribution control system, said control system comprising:
    a torque distribution mechanism transmitting a torque of an engine to a drive wheel at a predetermined distribution ratio,
    a first sensor detecting a vehicle speed,
    a control unit setting said predetermined ratio of said torque distribution mechanism to a first value when said vehicle speed, detected by the first sensor, is in a first speed range, and to a second value larger than said first value when said vehicle speed is in a second speed range, which is lower than said first speed range, and
    a second sensor for detecting a specific operation performed by a driver while the vehicle is stationary and the engine is running,
    wherein said control unit sets said predetermined ratio to a third value less than said second value and greater than zero when said specific operation is detected by said second sensor.

2. A vehicle drive torque distribution control system as defined in claim 1, wherein said third value is set larger than said first value.

3. A vehicle drive torque distribution control system as defined in claim 1, wherein said first sensor detects a rotation speed of said drive wheel.

4. A vehicle drive torque distribution control system, said control system comprising:
    a torque distribution mechanism transmitting a torque of an engine to a drive wheel at a predetermined distribution ratio,
    a first sensor detecting a vehicle speed,
    a control unit setting said predetermined ratio of said torque distribution mechanism to a first value when said vehicle speed, detected by the first sensor, is in a first speed range, and to a second value larger than said first value when said vehicle speed is in a second speed range, which is lower than said first speed range, and
    a second sensor for detecting a specific operation by a driver performed while the vehicle is stationary and the engine is running,
    wherein said control unit sets said predetermined ratio to a third value less than said second value when said specific operation is detected by said second sensor, and
    wherein said second sensor detects an operation of a parking brake with which the vehicle is provided.

5. A drive torque distribution control system, said control system comprising:
    a torque distribution mechanism transmitting an output torque of an automatic transmission to a drive wheel at a predetermined distribution ratio,
    a first sensor detecting a vehicle speed,
    a control unit setting said predetermined ratio of said torque distribution mechanism to a first value when said vehicle speed, detected by said first sensor, is in a first speed range, and to a second value larger than said first value when said vehicle speed is in a second speed range, which is lower than said first speed range, and
    a second sensor detecting that said automatic transmission is in a speed change position corresponding to a stopping of the vehicle,
    wherein said control unit sets said predetermined ratio to a third value less than said second value and greater than zero when said second sensor detects that said automatic transmission is changed over to a speed change position corresponding to the stopping of the vehicle.

6. A drive torque distribution control system according to claim 5, wherein said second sensor includes an inhibitor switch generating a signal according to a position of a shift lever of said automatic transmission.

7. A vehicle drive torque distribution control system as defined in claim 6, wherein said third value is set larger than said first value.

8. A vehicle drive torque distribution control system, said control system comprising:
    a torque distribution mechanism transmitting a torque of an engine to a drive wheel at a predetermined distribution ratio,
    a first sensor detecting a vehicle speed,
    a second sensor detecting a specific operation performed by a driver while the vehicle is stationary and the engine is running, and
    a microprocessor programmed to:
        set said predetermined ratio of said torque distribution mechanism to a first value when said vehicle speed detected by said first sensor is in a first speed range,
        set said predetermined ratio to a second value larger than said first value when said vehicle speed detected by said first sensor is in a second speed range, which is lower than said first speed range, and
        set said predetermined ratio to a third value less than said second value and greater than zero when said specific operation is detected by said second sensor.

9. A vehicle drive torque distribution control system, said control system comprising:
    a torque distribution mechanism transmitting a torque of an engine to a drive wheel at a predetermined distribution ratio,
    a first sensor detecting a vehicle speed,
    a second sensor detecting a specific operation performed by a driver while the vehicle is stationary and the engine is running, and
    a microprocessor programmed to:
        set said predetermined ratio of said torque distribution mechanism to a first value when said vehicle speed detected by said first sensor is in a first speed range,
        set said predetermined ratio to a second value larger than said first value when said vehicle speed detected by said first sensor is in a second speed range, which is lower than said first speed range, and set said predetermined ratio to a third value less than said second value when said specific operation is detected by said second sensor, and wherein said specific operation comprises an operation of a parking brake with which the vehicle is provided.

10. A drive torque distribution control system, said control system comprising:

a torque distribution mechanism transmitting an output torque of an automatic transmission to a drive wheel at a predetermined distribution ratio, a first sensor detecting a vehicle speed, a second sensor detecting that said automatic transmission is in a speed change position corresponding to a stopping of the vehicle, and a microprocessor programmed to:

set said predetermined ratio of said torque distribution mechanism to a first value when said vehicle speed detected by said first sensor is in a first speed range, set said predetermined ratio to a second value larger than said first value when said vehicle speed detected by said first sensor is in a second speed range which is lower than said first speed range, and set said predetermined ratio to a third value less than said second value and greater than zero when said second sensor detects that said automatic transmission is changed over to a speed change position corresponding to the stopping of the vehicle.

* * * * *